United States Patent [19]

Schneider, Jr

[11] Patent Number: 4,498,346

[45] Date of Patent: Feb. 12, 1985

[54] METERED GAS VOLUME CORRECTING ARRANGEMENT

[75] Inventor: George W. Schneider, Jr, Huntingdon Valley, Pa.

[73] Assignee: The Singer Company, Stamford, Conn.

[21] Appl. No.: 492,293

[22] Filed: May 6, 1983

[51] Int. Cl.³ .............................................. G01F 15/02
[52] U.S. Cl. .................................... 73/861.01; 73/233
[58] Field of Search ............................. 73/233, 861.01

[56] References Cited

U.S. PATENT DOCUMENTS

| | | |
|---|---|---|
| 2,438,934 | 4/1948 | Marsh . |
| 2,438,935 | 4/1948 | Marsh . |
| 2,791,118 | 5/1957 | Holtz . |
| 2,884,793 | 5/1959 | Billeter ................................. 73/233 |
| 2,942,497 | 6/1960 | Berck . |
| 3,012,435 | 12/1961 | Brising . |
| 3,166,937 | 1/1965 | Farrell . |
| 3,224,273 | 12/1965 | Granberg . |
| 3,266,310 | 8/1966 | Buffer . |
| 3,283,575 | 11/1966 | Granberg . |
| 3,299,705 | 1/1967 | Shallenberg . |
| 3,427,890 | 2/1969 | Rossi et al. . |
| 3,472,072 | 10/1969 | Kunstadt et al. ..................... 73/233 |
| 3,581,566 | 6/1971 | Goff et al. . |
| 3,733,904 | 5/1973 | Bonner et al. . |
| 3,854,335 | 12/1974 | Garnett ............................... 73/233 |
| 3,969,939 | 7/1976 | Grzeslo . |
| 4,216,674 | 8/1980 | Butcher . |

Primary Examiner—Herbert Goldstein
Attorney, Agent, or Firm—William V. Ebs; Robert E. Smith; Edward L. Bell

[57] ABSTRACT

Variable ratio transmission mechanism and associated gearing correct volumetric flow indications of a gas meter as a function of temperature and/or pressure variations in gas flowing through the meter, or by a manually selectable fixed factor adjustment.

12 Claims, 12 Drawing Figures

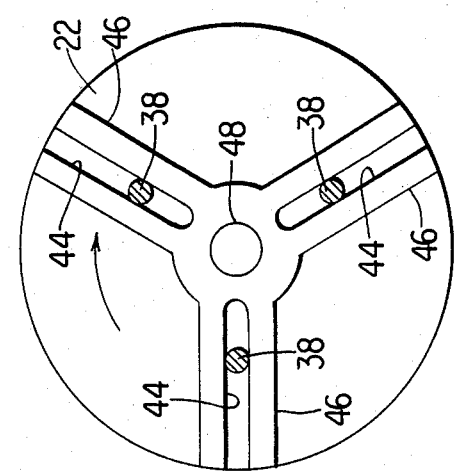
Fig.2
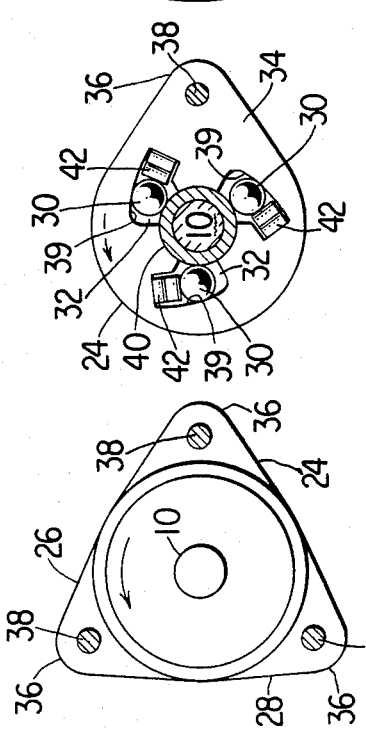
Fig.3
Fig.4
Fig.5
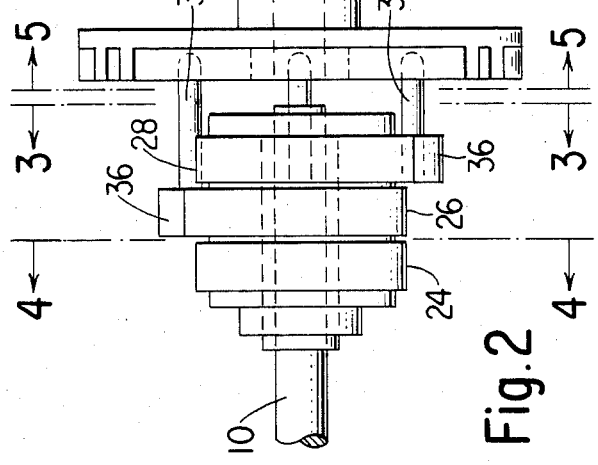
Fig.6
TEMPERATURE RESPONSIVE TRANSMISSION
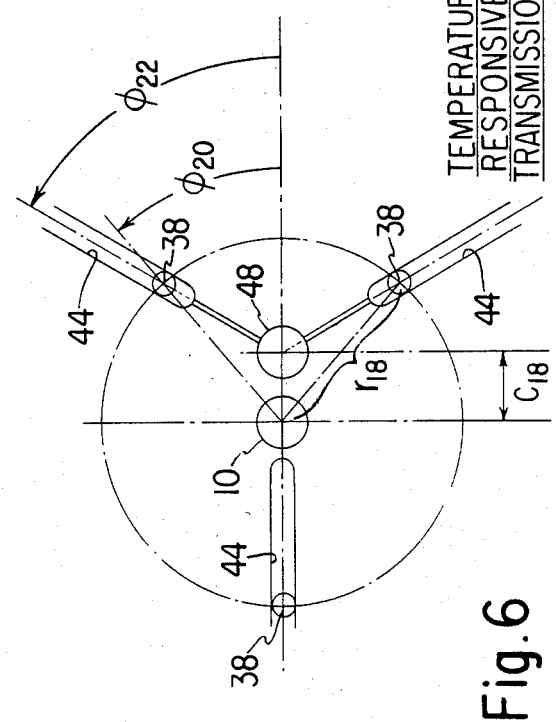
Fig.7
PRESSURE RESPONSIVE TRANSMISSION

1

METERED GAS VOLUME CORRECTING ARRANGEMENT

DESCRIPTION

1. Field of the Invention

The invention relates to mechanism for correcting the volumetric flow indications of a gas meter.

2. Description of the Prior Art

It is well known that the volume of gas flowing through a meter will vary with temperature and pressure changes, and that for the purpose of billing a customer, it may be necessary to provide a meter with mechanism for continuously correcting volumetric flow indication through the device to standard conditions such as 14.73 PSIA. and 60° F. Even in applications where the temperature and/or pressure of the gas flowing through a meter remains substantially constant it may be necessary to apply a fixed factor meter calibrating type of correction to the volumetric flow indications.

It is a prime object of the present invention to provide mechanism with which volumetric flow indications through a meter can be accurately and continuously corrected over a wide range of temperature and/or pressure variations, or with which volumetric flow indications through a meter can be accurately corrected by a manually selected fixed factor adjustment.

It is another object of the invention to provide mechanism for continuously correcting the volumetric flow indications of a gas meter in an improved manner as a function of temperature and pressure variations in the gas flowing through the meter.

It is still another object of the invention to correct the volumetric flow indications of a gas meter for pressure variations with a pressure correcting factor obtainable according to eccentricity of parts of a variable ratio transmission and the gear ratio of a multiplying planetary gear train.

It is also an object of the invention to provide meter correcting mechanism with a variable ratio transmission which is capable of driving output mechanism connected thereto smoothly while one of the transmission parts is eccentrically displaced relative to others to effect a volumetric correction.

Other objects and advantages of the invention will become apparent during a reading of the specification taken in connection with the accompanying drawings.

SUMMARY OF THE INVENTION

Mechanism for continuously correcting volumetric flow indications of a gas meter for temperature and pressure variations is provided with a pair of variable ratio transmissions which operably connect an input shaft rotatable according to actual volumetric flow through the meter with an output shaft that drives a counter indicating gas consumption. Each transmission preferably includes an assembly in which there are a plurality of undirectional clutches symmetrically arranged about a common axis, and a member relatively movable with respect to such axis for changing the ratio of the transmission. A temperature responsive device controls the ratio of one transmission in a manner resulting in a temperature corrected speed for said output shaft. A pressure responsive device controls the ratio of the other transmission in a manner resulting in the application of a pressure correction which is linearlly dependent upon pressure to the output shaft driving the counter, either directly or through a ratio multiplying planetary gear train.

Temperature responsive portions of the described mechanism may be eliminated when only a pressure correction to a meter is required. Similarly, pressure responsive portions may be eliminated if only a temperature correction is required. A manually adjustable control in association with a transmission and other portions of the described mechanism may be used to effect the application of a fixed factor adjustment to the volumetric indications of a meter.

DESCRIPTION OF THE DRAWINGS

FIG. 2 is a plan view of a variable ratio transmission used in the arrangement of FIG. 1;

FIG. 3 is a cross sectional view taken through the transmission on the plane of the line 3—3 of FIG. 2;

FIG. 4 is a cross sectional view taken through the transmission on the plane of the line 4—4 of FIG. 2;

FIG. 5 is a cross sectional view taken through the transmission on the plane of the line 5—5 of FIG. 2;

FIGS. 6 and 7 are schematic drawings which illustrate the operation of a temperature responsive variable ratio transmission and a pressure responsive variable transmission respectively in the said arrangement;

FIG. 12 is a schematic perspective view illustrating a manually operable selector for use in effecting the application of a fixed factor adjustmeht to the volumetric flow indications of a meter.

DESCRIPTION OF THE INVENTION

Figure 1:
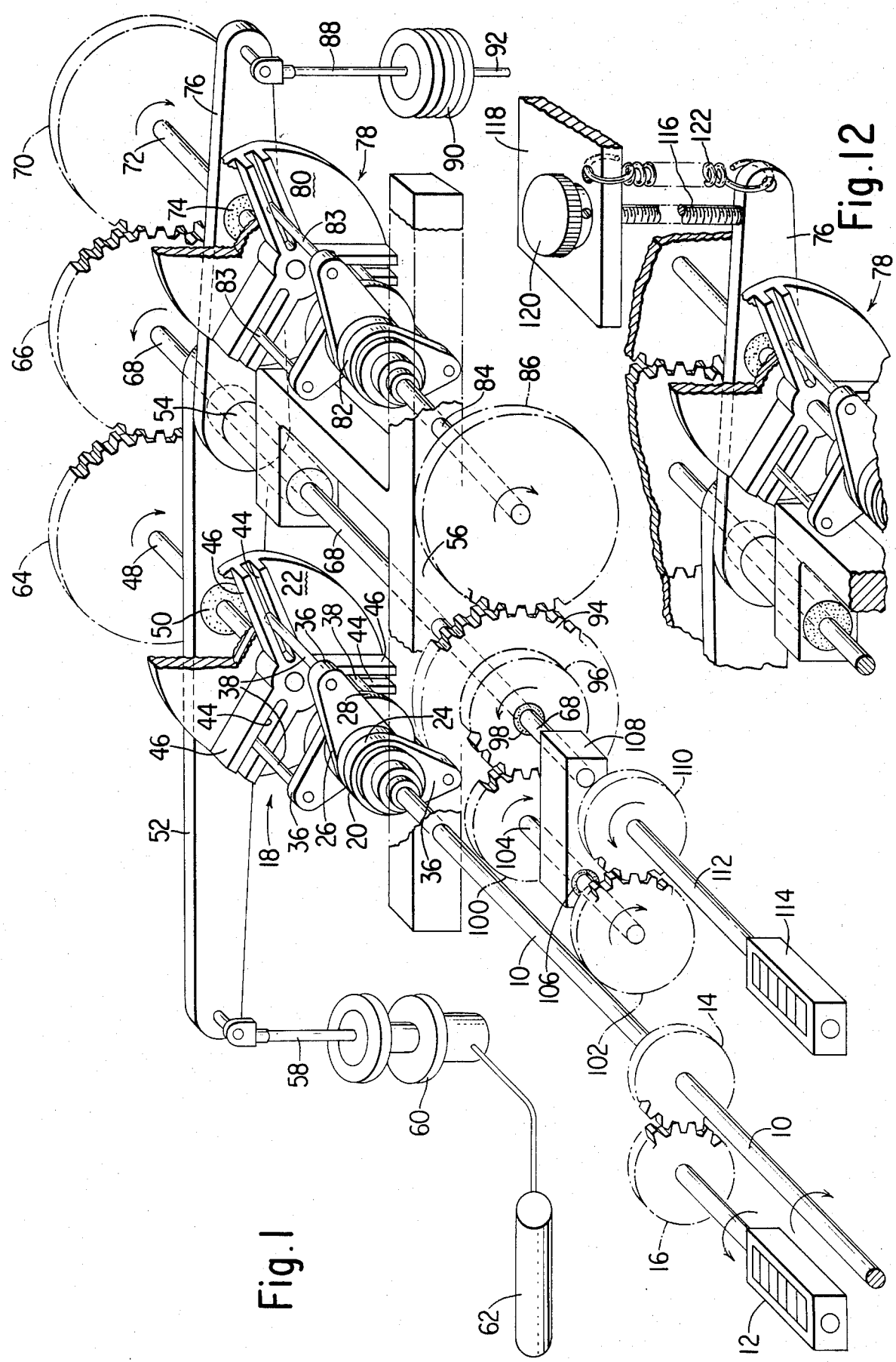
FIG. 1 is a schematic perspective drawing illustrating an arrangement according to the invention for continuously correcting volumetric flow indications of a gas meter to a base temperature and pressure.

Referring to FIGS. 1 through 7 showing an arrangement according to the invention for continuously correcting volumetric flow indications of a gas meter to a base temperature and pressure, there may be seen an input shaft 10 which rotates at a speed that is a direct measure of volumetric flow through the meter. A counter 12 directly connected to shaft 10 as, for example, through like gears 14 and 16 would be caused to record the actual volumetric flow of gas through the meter.

The said correcting arrangement is provided with a variable ratio transmission 18 which includes an input clutch assembly 20 and an output wriggler 22. Assembly 20 includes a plurality of identical clutches which are disposed about a common axis. Although the assembly may have as few as two clutches, three or more are preferred, since the greater number provides for smoother operation of the transmission. Three such clutches have been shown in the drawings. The clutches may be of the commercially available roller, sprag, spring or ratchet unidirectionally operable types. FIGS. 1, 2, 3 and 4 show a clutch assembly 20 consisting of three unidirectional roller clutches 24, 26 and 28. Each clutch includes one or more rollers 30 (three shown) or balls singular disposed in the pockets 32 of a clutch body 34 having an arm 36 formed thereon. Each pocket 32 has a wedge-shaped wall 39 that causes a roller or ball in the pocket to be forced against a surface 40 on shaft 10 and a driving relationship to be established between shaft 10 and clutch body 34 whenever the shaft as viewed in FIG. 4, is caused to rotate in a counter-clockwise direction relative to the clutch body. Relative rotation of the shaft and clutch body in the opposite sense results in an overrunning condition. The rollers 30 are held against wall 39 and shaft 10 by springs 42 to prevent backlash and provide for instant clutch engagement. The clutch arms 36 carry drive pins 38 which may be seen extending into sliding engagement with the wriggler 22 in radial grooves 44 formed in wriggler arms 46, such arms preferably being symmetrically arranged about the axis of a shaft 48 to which the wriggler is non-rotatably affixed. Alternatively, the pins 38 may have rollers journalled thereon to engage the wriggler in grooves 44.

Shaft 48 is rotatable in a bearing 50 which is carried by an arm 52 that is mounted at one end for pivotal movement on a bearing 54 affixed in a frame 56. The opposite end of the arm is connected to the output linkage 58 of a bellows 60 in a temperature system which also includes a temperature bulb 62 that is connected to the bellows and is located in the gas steam of a meter to sense the temperature of the gas flowing through it. The temperature sensing system is liquid filled and any change in the gas temperature produces a change in the volume of the liquid that operates the bellows 60 to effect a displacement of the output linkage 58 linearlly proportional to the temperature change. Linkage 58 pivots arm 52 (upwardly during temperature increases and downwardly during temperature decreases), and the arm moves wriggler shaft 48 relative to input shaft 10 to change the ratio $R_{18} = \phi_{22}/\phi_{20}$ of the variable ratio transmission 18 where $\phi_{22}$ is the angular output of the wriggler 22 and $\phi_{20}$ is the angular input of the clutch assembly 20.

$R_{18}$ is a function of the eccentricity $C_{18}$ of the axes of shafts 10 and 48 according to the relationship $$R_{18} = \frac{\phi_{22}}{\phi_{20}} = \frac{60}{\cos^{-1}\left(\frac{(C_{18}^2 r_{18}^2 - 3C_{18}^2)}{(-3C_{18}r_{18} + r_{18}\sqrt{4r_{18}^2 - 3C_{18}^2})}\right)}$$

in which $r_{18}$ is the radial distance between the axis of shaft 10 and drive pins 38 (See FIG. 6). Upward movement of arm 52 as viewed in FIG. 1 in response to a temperature increase results in a decrease in eccentricity whereas downward movement of the arm in response to a temperature decrease results in an increase in eccentricity. Eccentricity therefor varies inversely in proportion to temperature changes in the gas. However, the eccentricity C appears in the denominator of the expression for $R_{18}$, and the output speed of shaft 48 while driven by shaft 10 through transmission 18, is caused to vary in proportion to temperature changes in the gas.

While the clutch assembly 20 has been shown on the input side of transmission 18 and wriggler 22 on the output side thereof, a reverse arrangement in which the wriggler is directly connected to input shaft for rotation thereby, and the clutch assembly drives shaft 48, is of course also possible. The transmission has been shown in line with input shaft 10, however, alternative designs are possible. Such an alternative design might, for example, have arm 52 pivotally journalled on shaft 10, a shaft parallel to shaft 10 rotatably mounted in the arm and operably connected through gearing to shaft 10 for rotation thereby, the clutch assembly 20 mounted on the said parallel shaft, and shaft 48 with the wriggler thereon rotatably mounted in frame 56.

Reference character 64 designates a gear which is driven by shaft 48 and which in turn drives a meshing gear 66. The gears 64 and 66 are provided with numbers of teeth $N_{64}$ and $N_{66}$ respectively as required to establish a gear ratio of $$\frac{N_{64}}{N_{66}} = \frac{T_{Base} + 460}{T_{Max} + 460}$$

where $T_{Base}$ = degrees Fahrenheit to which gas flow indication is to be corrected (as e.g. 60° F.)

$T_{Max}$ = maximum anticipated temperature in degrees Fahrenheit of gas flow in meter Such gear ratio is provided because the clutch assembly 20 and wriggler 22 of transmission 18 are disposed for alignment at the said anticipated maximum temperature $T_M$. Temperature increases in the gas result in movement of the wriggler axis from a position offset from the axis of the clutch assembly toward a position of alignment, and with the gear ratio $N_{64}/N_{66}$ established as indicated, gear 66 and the shaft 68 on which it is affixed are caused to rotate at a speed directly reading gas flow as corrected to the base temperature $T_{Base}$. Shaft 68 is rotatably supported in frame 56 as shown.

Gear 66 drives a gear 70 which has the same numbers of teeth as gear 66 and is affixed to a shaft 72 that is rotatably mounted in a bearing 74 located in an arm 76. Shaft 72 drives a variable ratio transmission 78 which is similar in construction to the transmission already described. The transmission 78 includes a wriggler 80 on the input side of the transmission 72 and a clutch assembly 82 on the output side with interconnecting drive pins 83 therebetween. Shaft 72 drives the wriggler 80, the wriggler drives the clutch assembly 82, and the clutch assembly drives a shaft 84 which is rotatably mounted in frame 56 and has a gear 86 affixed thereon. Arm 76 is mounted at one end for pivotal movement on bearing 54 and is connected at the opposite end to the output linkage 88 of a pressure actuated bellows 90. The bellows 90 is rendered responsive to meter pressure through tubing 92 extending therefrom to the gas stream, and is caused to deflect linearlly with changes in meter pressure. The resulting motion of linkage 88 (upward with increasing pressure and downward with decreasing pressure) moves the axis of shaft 72 relative to the axis of shaft 84 and thereby alters the ratio $R_{78} = \phi_{82}/\phi_{80}$ of variable ratio transmission 78, $\phi_{82}$ being the angular output of clutch assembly 82 and $\phi_{80}$ being the angular input of wriggler 80.

With the described arrangement of transmission 78, its variable ratio is a function of the eccentricicity $C_{78}$ of the axis of the wriggler 80 and clutch assembly 82 according to the relationship:

$$R_{78} = \frac{\phi_{82}}{\phi_{80}} = \frac{\cos^{-1}\left(\frac{(3C_{78}^2 - r_{78}^2)}{(-3C_{78}r_{78} - r_{78}\sqrt{4r_{78}^2 - 3C_{78}^2})}\right)}{60}$$

where $r_{78}$ is the radial distance between the axis of the clutch assembly 82 and pins 83 (See FIG. 7). The eccentricity $C_{78}$ is a linear function of gas pressure and appears in the numerator of the expression for $R_{78}$. Consequently, the ratio $R_{78}$ and speed of shaft 84 vary linearrly in direct proportion to changes in gas pressure.

Increasing gas pressure results in movement of the axis of wriggler 80 in a direction which is away from the axis of clutch assembly 82, and causes the ratio $R_{78}$ to increase linearrly over the anticipated gas pressure range. If only low pressures are anticipated shaft 84 may be directly connected to a counter which would then be caused to read volumetric consumption as corrected to the base temperature and pressure. When high pressures in the meter are anticipated, and increases in the ratio $R_{78}$ are limited by the structure of the transmission to an extent preventing the transmission by itself from effecting a required pressure correction in the system of FIG. 1, planetary gearing is provided for multiplying the variable ratio of transmission 78. Planetary gearing for such purpose is shown as including fixedly associated gears 94 and 96 which are rotatable on a bearing 98 mounted on shaft 68. The planetary gearing further includes gears 100 and 102 on a shaft 104 which is rotatable in a bearing 106 located in a planetary arm 108, and a gear 110 which is affixed on an output shaft 112. The planetary arm 108 is affixed to shaft 68 for rotation thereby. Gear 86 drives gear 94 which in turn drives gear 96. Gear 100 at one end of shaft 104 is driven by gear 96, and gear 110 is driven by gear 102 at the opposite end of shaft 104 from gear 100. Gear 110 drives output shaft 112 and the output shaft drives a counter 114. Gears 66 and 86 have the same number of teeth as do gears 70 and 94 in a preferred embodiment to obtain a 1 to 1 ratio between gear 66 and 94. However, other ratios are possible. Gear 100 has fewer teeth than gear 96, and gear 110 has fewer teeth than gear 102 in said preferred embodiment. For the purpose of simplifying the construction, gears 96 and 102 may be provided with the same number of teeth, as may gears 100 and 110 although other arrangements are possible. With an arrangement wherein gears 96 and 102 have the same number of teeth, and gears 100 and 110 also have the same number of teeth, the required ratio for $N_2/N_1$ in which $N_2$ is the number of teeth in gear 100 (or 110) and $N_1$ is the number of the teeth in gear 96 (or 102) is expressible as follows:

$$\frac{N_2}{N_1} = \sqrt{\frac{P_{max}}{P_{Base} \times (R_{max} - 1)}}$$

where $P_{max}$ is the maximum anticipated pressure of gas in the meter, and $R_{max}$ is the ratio corresponding thereto of transmission 78. $P_{Base}$ is the pressure to which gas flow indication is to be corrected (as e.g 14.73 PSIA).

As previously noted, shaft 68 rotates at a speed directly reading gas flow corrected to the base temperature. Transmission 78 and the associated planetary gearing apply a pressure correction, and output shaft 112 is caused to rotate at a speed resulting in a reading on counter 114 indicating volumetric consumption as corrected to the base temperature and pressure.

Figure 9:
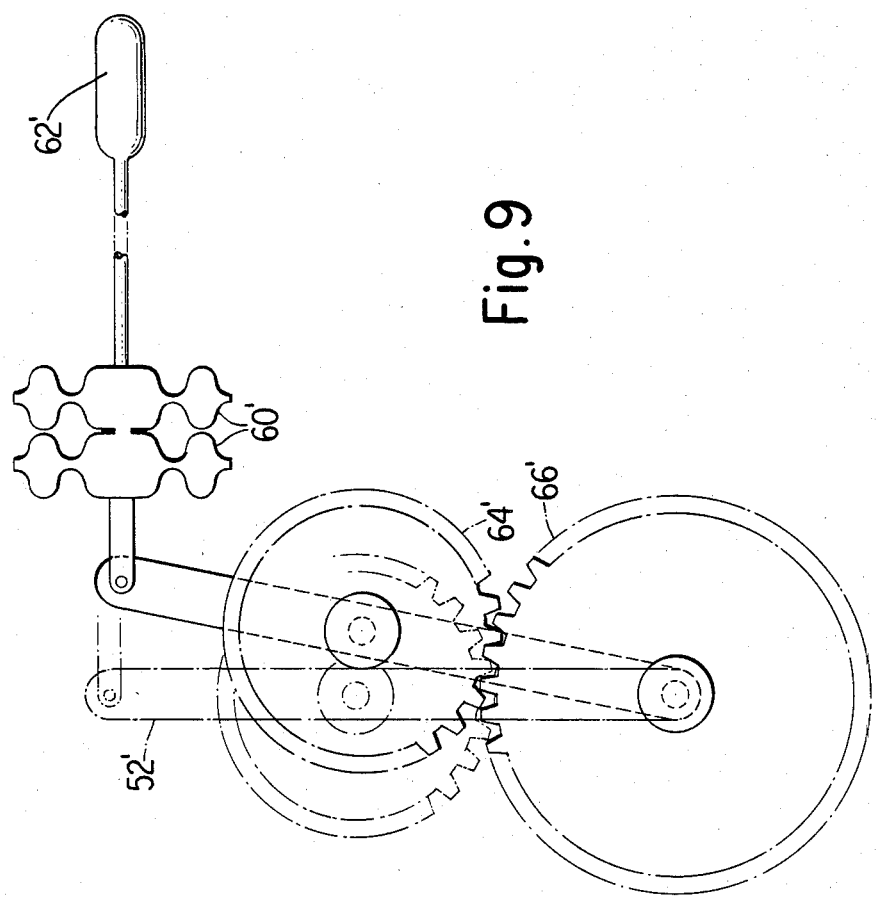
FIG. 9 is an end view of the modified arrangement shown in FIG. 8.
Figure 8:
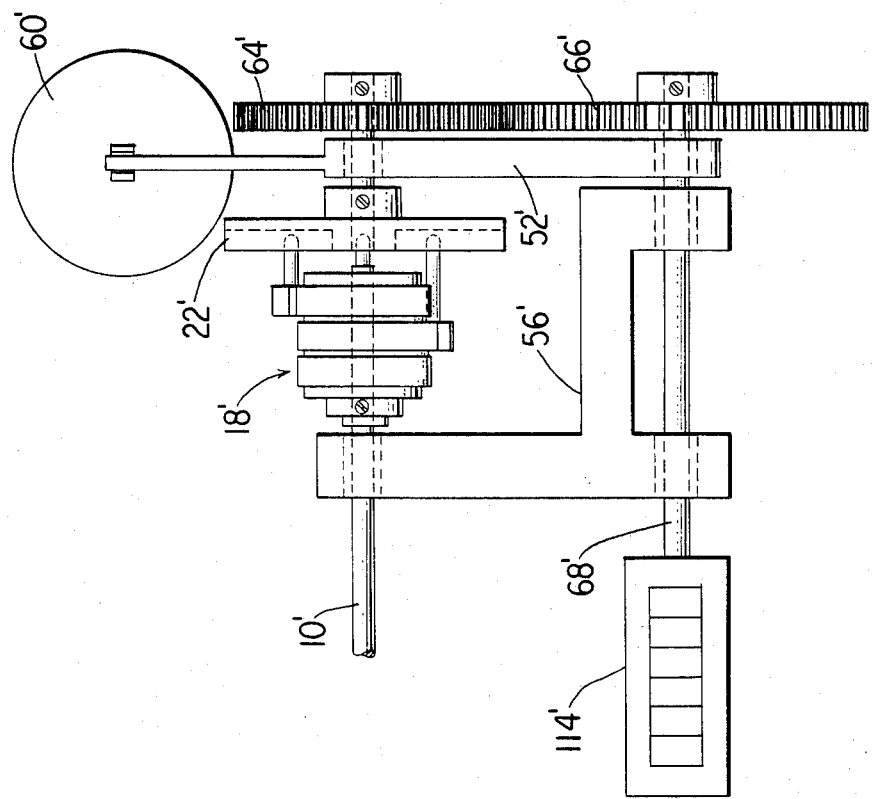
FIG. 8 is a schematic plan view of such arrangement as modified to correct for temperature variations only.

In some applications, volumetric flow indications only need to be corrected for temperature changes in the gas. An arrangement for such purpose, shown in FIGS. 8 and 9, may be seen to include mechanism as already described for use in effecting a temperature correction, such mechanism being identified therein with reference characters which are the same as those previously used for like parts except for a prime mark(') which has been added thereto. In the arrangement of FIGS. 8 and 9 an input shaft 10', which is rotated according to actual volumetric flow, drives shaft 68' through variable transmission 18' and gears 64' and 66'. Shaft 68' is directly connected a counter 114'. The transmission ratio is altered by movement of arm 52' in response to the operation of bellows 60' as determined by temperature sensor 62', and counter 114' is directly driven by shaft 68' to indicate volumetric gas consumption as corrected for gas temperature.

Figure 11:
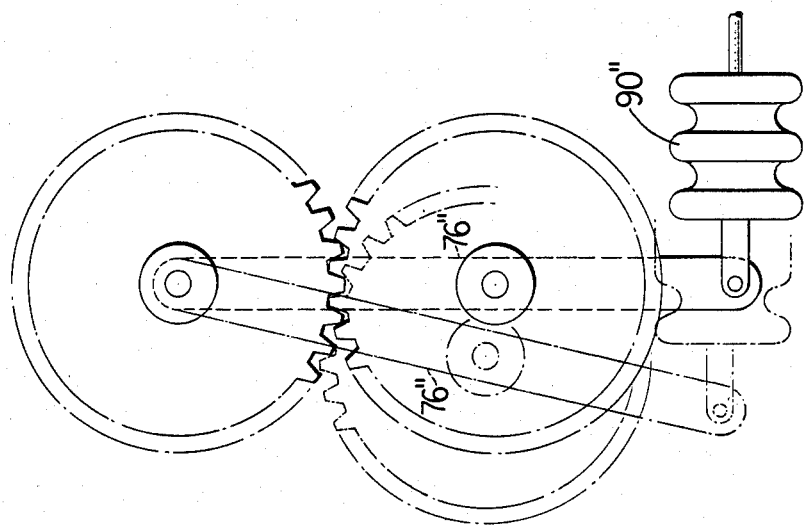
FIG. 11 is an end view of the modified arrangement shown in FIG. 10.
Figure 10:
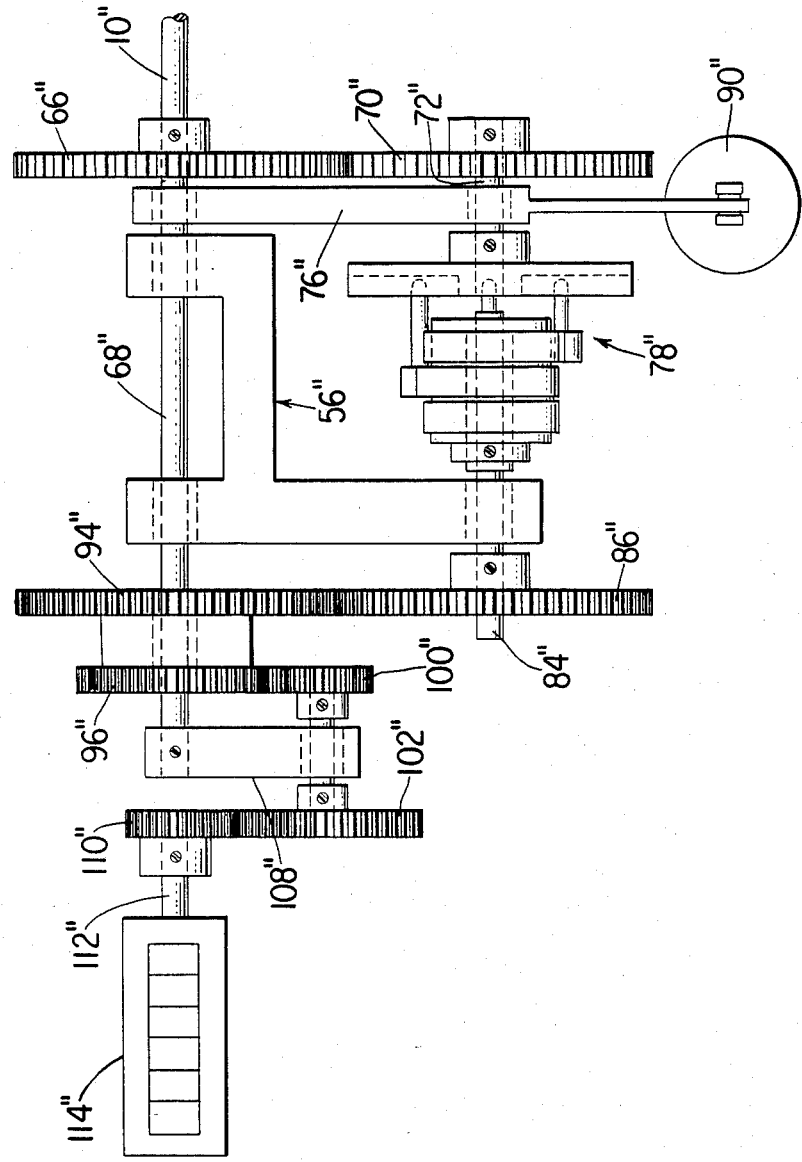
FIG. 10 is a schematic plan view of the arrangement of FIG. 1 as modified to correct for pressure variations only.

In other applications, only a pressure correction may be required. In an arrangement for such purpose shown in FIGS. 10 and 11, where parts corresponding to those previously described have been designated with like reference characters having a double prime mark (") added thereto, an input shaft 10" which is rotated according to actual volumetric flow is directly connected to both gear 66" and shaft 68". Gear 70" on shaft 72" is driven by gear 66" and shaft 72" which is rotatably mounted in arm 76" drives variable ratio transmission 78". Pressure sensitive bellows 90" controls the position of arm 76" and thereby the ratio of the variable transmission. The transmission drives shaft 112" through gear 86" and planetary gearing which includes gears 94", 96", 100", 102", 110" and planetary arm 108" affixed on shaft 68". Shaft 112" drives counter 114", and the counter is thereby caused to indicate volumetric gas consumption as corrected for pressure. The described arrangement is effective over a wide pressure range by reason of the planetary gearing. If only low pressures are anticipated, shaft 84" may drive counter 114" directly.

In situations where a meter is in operation at a fixed system pressure, and a fixed factor pressure adjustment is required, the pressure sensitive bellows in the arrangement of FIG. 1 (or FIGS. 10 and 11) may be replaced with manually controllable means. Such a manually controllable means may be seen in FIG. 12 as including a screw 116 adjustable in a fixed plate 118 by a knob 120, and a spring 122 for biasing arm 76 into enforced engagement with the end of screw 116. The screw is adjusted in plate 118 to position arm 76 and thereby selectively determine the ratio of transmission 78. If desired, a plurality of geared knobs (as for example with 1 to 10 ratios) may be substituted for the single knob 120 to enable an operator to obtain increased resolution of the transmission ratio. In situations where a meter only needs to be calibrated, the temperature responsive means including temperature sensing bulb 62 and bellows 60 of FIGS. 8 and 9 may be replaced with manually controllable adjustable means of the kind described.

It is to be understood that the present disclosure relates to preferred embodiments of the invention which is for purposes of illustration only and are not to be construed as limiting the invention. Numerous alterations and modifications of the structure herein disclosed will suggest themselves to those skilled in the art, and all such modifications and alterations which do not depart from the spirit and scope of the invention are intended to be included within the scope of the appended claims.

I claim:

1. Mechanism for correcting volumetric flow indications of a gas meter to a base temperature and pressure, said mechanism including an input shaft rotatable at a speed which is a measure of the actual volumetric gas flow, a first variable ratio transmission which is rotatable by the input shaft, means for altering the ratio of the first transmission in response to temperature changes in the gas, gearing operable by the first transmission for rotating a shaft connected thereto at a speed indicative of volumetric flow at the base temperature, a second variable ratio transmission which is operably connected to said gearing for rotation thereby, means for altering the ratio of the second transmission and speed of a shaft rotatable thereby in response to pressure changes in the gas, a gear on the shaft rotatable by the second transmission, and a multiplying planetary gear train operably connected to the gear on the shaft rotatable by the second transmission and to the shaft drivable by the gearing operable by the first transmission for rotating an output shaft at a speed indicative of volumetric flow at the base temperature and pressure.

2. Mechanism as defined in claim 1 wherein the planetary gearing includes a planet arm rotatable by the shaft that is rotatable by said gearing operable by the first transmission, said planetary gearing also including a gear that is rotatably mounted on such shaft and is engaged by the gear on the shaft rotatable by the second transmission.

3. Mechanism as defined in claim 1 wherein the first transmission includes an input assembly rotatable by the input shaft and an output member rotatable by the input assembly, the output member having a rotational axis which is in alignment with the rotational axis of the input assembly at a predetermined maximum anticipated temperature of the gas greater than the base temperature, said axis of the output member being movable by the temperature responsive ratio altering means away from a position of alignment with the axis of the input assembly to increase the speed of the output member as the temperature of the gas decreases and toward the position of alignment to decrease the speed of the output member as the temperature of the gas increases, the gearing rotatable by the first transmission having a gear ratio for driving the said shaft connected thereto at the speed of said input shaft when the gas is at the base temperature.

4. Mechanism as defined in claim 3 wherein the second transmission includes an output assembly and an input member which is movable by the pressure responsive ratio altering means for linearlly increasing and decreasing the speed of the output assembly of the second transmission as gas pressure is increased and decreased respectively.

5. Mechanism as defined in claim 1 wherein each of the variable ratio transmissions includes a clutch assembly and a member relatively movable with respect thereto for effecting a change in the ratio of the transmission, said assembly including multiple unidirectional clutches with drive pins extending therefrom, and said member including radial slots wherein the pins are operably connected to the member.

6. Mechanism as defined in claim 5 wherein each clutch assembly includes a plurality of unidirectional clutches which are symmetrically arranged about a common axis of rotation.

7. Mechanism for correcting volumetric flow indication of a gas meter to a base pressure, said mechanism including an input shaft rotatable at a speed which is a measure of the volumetric gas flow, a variable ratio transmission which is operably connected to said input shaft for rotation thereby, means responsive to pressure changes in the gas for altering the ratio of the transmission to linearly increase and decrease the speed of a shaft rotatable thereby as pressure in the gas increases and decreases respectively, a gear on the shaft rotatable by the transmission, and a multiplying planetary gear train operably connected to said gear and to the said input shaft for rotating an output shaft at a speed indicative of volumetric flow at the base pressure.

8. Mechanism for correcting volumetric flow indications of a gas meter, said mechanism including an input shaft rotatable at a speed which is a measure of the volumetric gas flow through the meter, a variable ratio transmission including an input member which is operably connected to said input shaft for rotation thereby and an output assembly rotatable by the input member, means for manually selecting a ratio for the transmission to provide for the rotation of the output assembly at a speed corresponding to the speed of said input member as affected by a mulitiplying factor determined by the transmission ratio, a shaft rotatable by the output assembly, a gear on said shaft, and a multiplying planetary gear train connected to said gear and to the said input shaft for rotating an output shaft at a speed indicating corrected volumetric flow, the input member of the transmission having an axis of rotation fixedly located in a pivotally movable arm with which the input member can be disposed relative to the output assembly to determine the transmission ratio, the arm being connected to the manually operable means for selective positioning thereby.

9. Mechanism for correcting volumetric flow indications of a gas meter to a base temperature and pressure, said mechanism including an input shaft rotatable at a speed which is a measure of actual volumetric gas flow, a pair of variable ratio transmissions, a first one of which is driven by the input shaft, a first gear which is driven by the first transmission, a second gear which is driven by the first gear, a third gear which is driven by the second gear and which drives the second transmission, each transmission including a clutch assembly and a wriggler, a pair of arms pivotally movable about a common axis which is also the axis of rotation of said second gear, one of the arms having the axis of rotation of the clutch assembly or wriggler of one transmission fixedly located therein, and the other arm having the axis of rotation of the clutch assembly or wriggler of the other transmission fixedly located therein, means responsive to temperature changes in the meter for moving one arm to relatively displace the clutch assembly and wriggler of the associated transmission and change the ratio thereof, means responsive to pressure changes in the meter for moving the other arm to relatively displace the clutch assembly and wriggler of the other transmission, an output shaft operably connected to said transmission for rotation at a speed dependent upon the operating ratios of the transmission, and a counter operably connected to the output shaft for indicating volumetric gas flow as corrected for temperature and pressure variations.

10. Mechanism defined in claim 9 wherein each clutch assembly includes a plurality of unidirectional clutches.

11. Mechanism as defined in claim 9 wherein the clutches are symmetrically arranged about the axis of rotation thereof.

12. Mechanism as defined in claim 9 wherein each clutch assembly includes at least three unidirectional clutches symmetrically arranged about the axis of rotation thereof.

* * * * *